N. MABRY.
COTTON CHOPPER.
APPLICATION FILED NOV. 21, 1908.
937,160.
Patented Oct. 19, 1909.
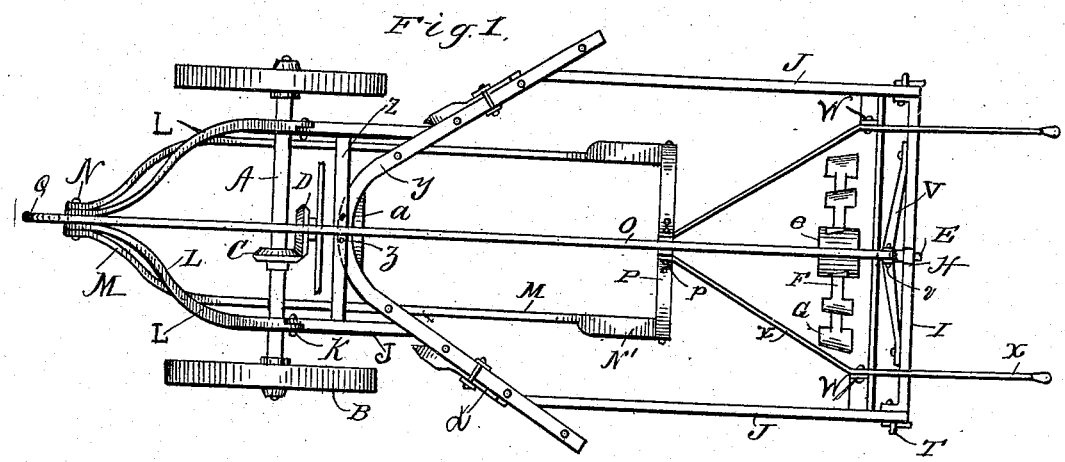
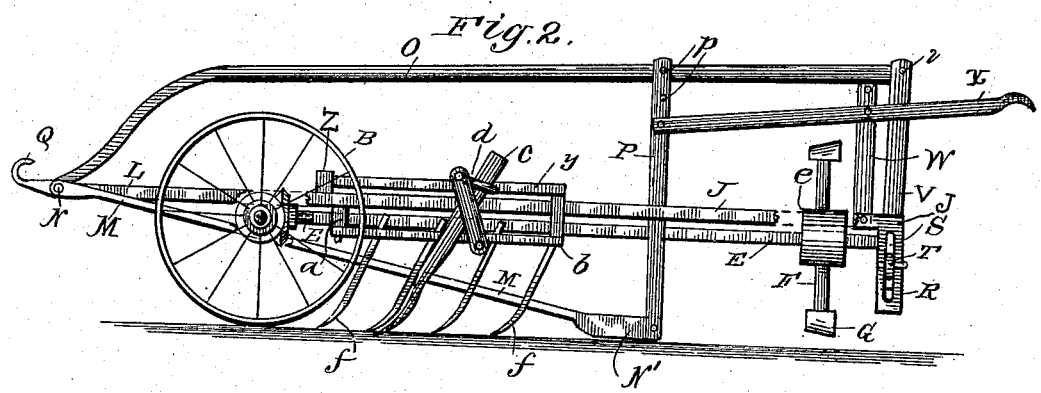
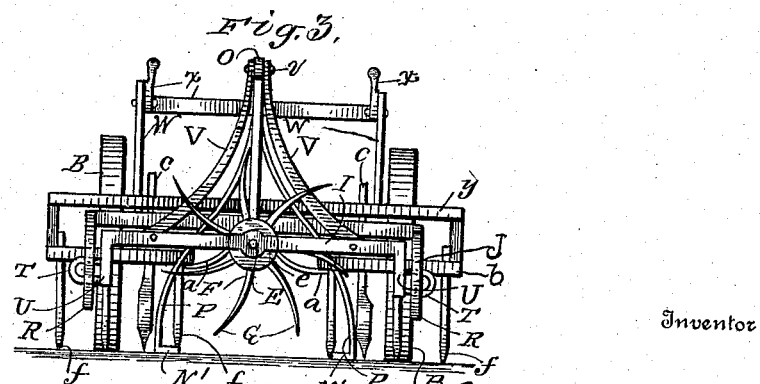

UNITED STATES PATENT OFFICE.

NARVELL MABRY, OF MERIDIAN, MISSISSIPPI.

COTTON-CHOPPER.

937,160.     Specification of Letters Patent.     Patented Oct. 19, 1909.

Application filed November 21, 1908. Serial No. 463,860.

*To all whom it may concern:*

Be it known that I, NARVELL MABRY, a citizen of the United States of America, residing at Meridian, in the county of Lauderdale and State of Mississippi, have invented certain new and useful Improvements in Cotton-Choppers, of which the following is a specification.

This invention relates more particularly to cotton choppers, although said invention also includes a cultivator or harrow adapted to till the ground at the time the cotton chopper is being drawn thereover.

An object of this invention is to provide novel means for maintaining the cotton chopper in operative relation to the stalks or plants to be cut, the said means comprising supports adapted to slide on the surface of the ground, means being also provided for adjustably supporting the bearing of the cotton chopper shaft with relation to the sliding support.

A further object of this invention is to provide a bearing for the shaft of the cotton chopper and a frame with relation to which the bearing may be adjusted and means operating in connection with the frame for clamping the shanks of harrow or cultivator teeth in place on the frame.

With the foregoing and other objects in view, the invention consists in the details of construction and in the arrangement and combination of parts to be hereinafter more fully set forth and claimed.

In describing the invention in detail, reference will be had to the accompanying drawings forming part of this specification wherein like characters denote corresponding parts in the several views, in which—

Figure 1, is a top plan view of a cotton chopper embodying the invention; Fig. 2, illustrates a view in elevation thereof; and Fig. 3, illustrates a rear elevation thereof.

In the drawings A, denotes a rotary front axle having the usual traction wheels B, by which the front of the frame is supported. The axle A, carries a beveled gear wheel C, meshing with a gear wheel D, by which a shaft E, is rotated, the said shaft carrying a head e, having the arms F, and said arms carry the blades G, which act to chop or cut the cotton, corn, or other stalks or plants. The rear end of the shaft E, is journaled in a bearing H, carried by the sill I, which sill is adjustably supported by means to be hereinafter referred to. The sides J, of the frame converge toward the front and are pivotally connected by the joints K, to the diverging arms L, which diverging arms are supported by the axle A. The forward ends of the arms L, are nested in connection with the forward ends of arms M, and said arms are secured together by means of the bolt N, or like securing device. The arms M, diverge and extend downwardly and rearwardly and terminate in shoes N', which ride over the surface of the ground said arms M, being integral with said shoes N'. A bar O, extends from the junction of the arms L and M, upwardly and rearwardly and said bar has the standards P, adjustably connected to it, and said standards in turn are connected to the shoes N'. The forward end portion of the bar is preferably secured to the nested ends of the arms L and M, and has a forward extension terminating in a hook Q, to which any suitable draft rigging could be connected.

The rear portions of the sides J of the frame extend downwardly as shown at R, and slots S, are formed therein for the reception of loops or projections T, which are attached to the angular ends U, of the sill I, hence said sill is slidable vertically with relation to the sides J, of the frame, in order that the chopper shaft E, which is supported by the sill may be adjusted vertically to change the relation of the cutting blades to the surface over which they travel. The sill I, has braces V, connected to the bar O and is secured thereto by the fastening v, which may be in the form of a bolt, rivet or the like. As the fastening for the standards P, may secure the said standards to the bar O, by entering the apertures p, it follows that when the said fastening is applied to the lower aperture, the rear portion of the frame and with it the sill I, would be lowered and hence the blades of the chopper will operate closer to the ground than they would operate when the bar O, is secured to the standards in the position which they are now shown in Fig. 2, for as stated the shoes N', will ride over the surface of the ground and will maintain the cutter in such relation to the surface of the ground as is contemplated by the adjustment of the standards with relation to the bar.

The rear ends of the sides J, of the frame are provided with standards W, to which handles X, are secured, and the inner ends of said handles are connected to the standards P, as fully shown in Fig. 2. As heretofore stated, there is a sliding connection between the sill and the downwardly extending ends of the sides J, of the frame, and hence said sides of the frame are free to move vertically with relation to the sill and as the handles are connected to the standards W, it is preferable that the inner end of said handles be pivotally connected to the standards P, so that the operator may raise or lower the sides J, of the frame with relation to the sill and with relation to the standards P. This construction permits the operator, as stated, to lift the sides of the frame and as the harrow or cultivator teeth (to be presently explained) are carried by the sides of the frame, it follows that the operator may regulate the relation of the teeth to the surface of the ground independent of the action of the shoes N', and the cutters heretofore referred to.

As a means for securing the cultivator teeth to the sides J, of the frame, I provide a curved anchoring plate Y, which is secured to a bracket Z, by means of a fastening $z$. A second bracket $a$, has downwardly extending ends to which bearing plates $b$, are pivotally connected and as shown, the curved plate Y, and the bearing plate $b$, form the cultivator frame. The shanks $c$, of the cultivator teeth are secured to the curved plate and to the bearing plate by the clips $d$, and said clips embrace the sides J, of the frame and retain the curved plate and bearing plate in operative relation to the said sides J. The bearing plate $b$, is provided with apertures to receive the shanks of the harrow teeth $f$, which harrow teeth simply extend through the apertures of the said plate and are held therein by friction.

I claim—

1. A cotton chopper comprising an axle having wheels thereon, a frame comprising converging bars supported by said axle, a bar having a depending end, said bar pivoted to one end of said frame, standards at the other end of said frame supporting said bar, a shaft geared to the axle, a chopper near the end of said shaft, and means connected to the frame whereby the end of said shaft may be raised and lowered with relation to the bar having the depending end.

2. In a cotton chopper, an axle carrying traction wheels, converging bars supported by said axle, a bar formed with a depending end pivoted thereby to the converging bars, a shaft geared to the axle, standards on the bar, a runner shoe on each standard, said shoes having upwardly extending ends pivoted between the converging bars, a chopper on the shaft, and means for vertically adjusting the shaft.

3. A cotton chopper comprising an axle, having traction wheels thereon, a frame comprising bars supported by said axle, a bar formed with a depending end pivoted thereby to said converging bars, standards on said bar, runner shoes on said standards, said shoes having upwardly extending ends pivoted between said converging bars, means for connecting said frame to said bar, means whereby said bar may be adjusted in different positions on said standards, and a shaft carrying a chopper geared to said axle, said shaft suitably supported by said frame.

4. A cotton chopper comprising an axle having traction wheels thereon, a frame supported by said axle at its forward end, means whereby said frame is supported at its outer end, each side of the outer end extending downwardly and having slots in said downwardly extending portions, a sill within said frame and having projections adapted to enter said slots, a shaft carrying a chopper geared to said axle, the outer end of said shaft journaled in said sill, and means whereby said sill may be raised and lowered.

In testimony whereof, I affix my signature in the presence of two witnesses.

NARVELL MABRY.

Witnesses:
W. D. CAMERON,
W. C. MOORE.